Sept. 11, 1923.
E. REMACLE
CASTER FOR TOYS
Filed April 18, 1922
1,467,453
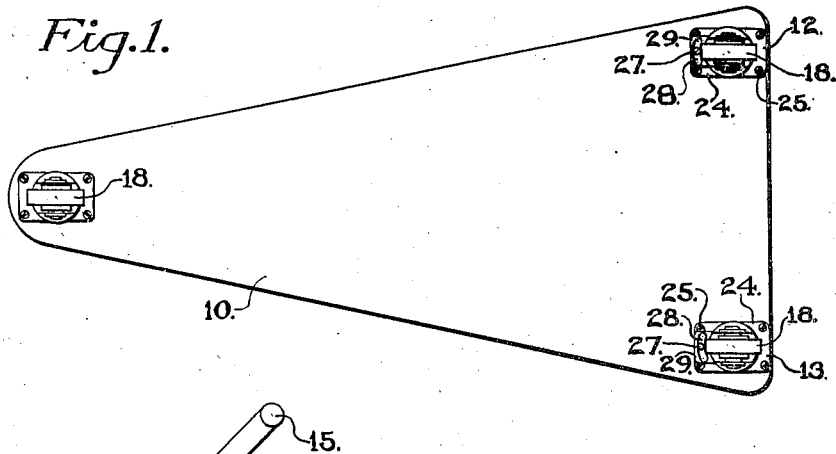
Fig.1.
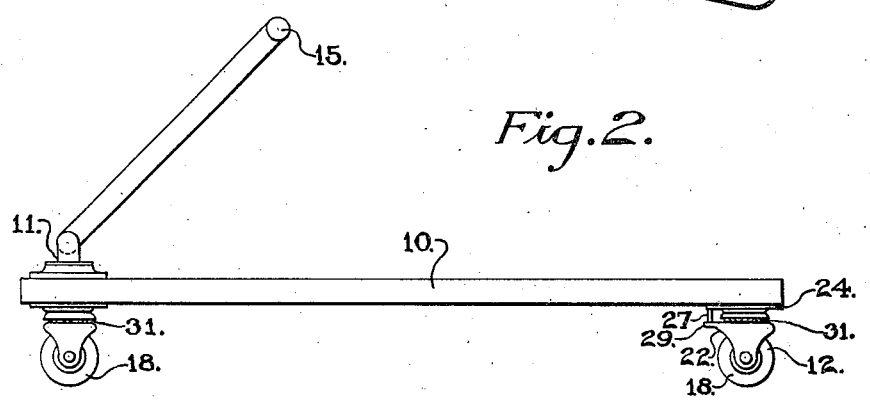
Fig.2.
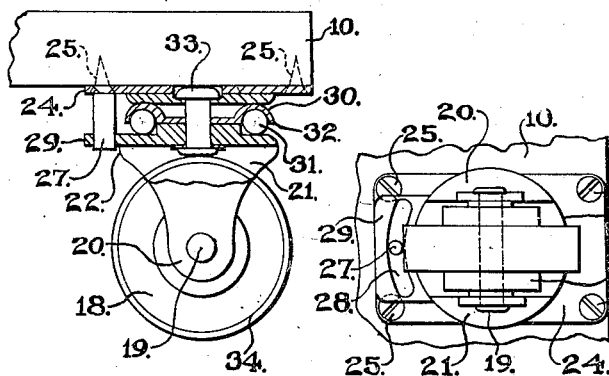
Fig.3.
Fig.4.
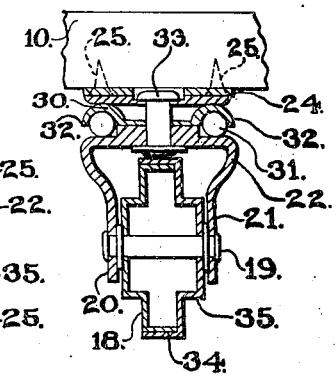
Fig.5.
Edmond Remacle
INVENTOR
BY Victor J. Evans
ATTORNEY
WITNESS:
H. A. LaClair.

Patented Sept. 11, 1923.

1,467,453

UNITED STATES PATENT OFFICE.

EDMOND REMACLE, OF NEWARK, NEW JERSEY.

CASTER FOR TOYS.

Application filed April 18, 1922. Serial No. 554,394.

*To all whom it may concern:*

Be it known that I, EDMOND REMACLE, a citizen of the United States, residing at Newark, in the county of Essex and State of New Jersey, have invented new and useful Improvements in Casters for Toys, of which the following is a specification.

This invention relates to a caster intended especially for use in that class of toys termed coasters.

One object is to provide a device for use on a coaster of the type designed to be propelled by the movement of the body of the user from side to side, causing a similar movement of the rear portion of the vehicle, and with proper guidance, the forward movement of the vehicle.

A further object is to provide a caster which shall include a yoke mounted in a particular manner on ball bearings, the yoke including an extension provided with a segmental slot engaging a stationary element for limiting the swing of the vehicle when being propelled as above indicated.

A still further object is to provide particular mounting means for the separate elements of the ball bearing, and a particular form of caster wheel to be carried by the yoke.

With the foregoing and other objects in view, the invention consists in the novel construction and arrangement of elements described and claimed, it being understood that modifications may be made within the scope of the claims without departing from the spirit of invention.

In the drawings, Figure 1 is a bottom plan view of a coaster showing several casters applied thereto; Figure 2 shows the above structure in side elevation; Figure 3 shows a caster in vertical section and elevation; Fig. 4 is a bottom plan view thereof; Figure 5 is a vertical section transversely of the yoke and in the direction of the action of the axis of the wheel.

The caster being especially intended for use in the manner indicated, I have shown conventionally one of these toys, sometimes termed a portable platform. The body is designated 10, and the front caster wheel, designed for steering is shown at 11, and the rear caster wheels are indicated by reference numbers 12 and 13. A steering handle is shown at 15.

In the detail illustration of the casters, especially the rear casters, the wheel is designated 18, being mounted on a spindle 19 fixed in the side elements 20 and 21 of the yoke 22.

A rectangular plate 24 is secured by screws 25 to the underside of the body 10, and secured to this plate is a stud 27 which enters a segmental slot 28 formed in an extension 29 integral with the yoke. This slot limits the movement of the caster in an arc of a circle struck from the pivotal mounting of the caster.

The race plate 30 is of the form shown, the balls 31 being located between this plate and the upper horizontal portion of the yoke 22, which portion forms the cooperating race way. Plate 30 is apertured centrally, the edge portions of the aperture being engaged by shank of the stud 33 which retains the yoke in position. This stud is headed on both ends, and the elements 24 and 30 are in intimate contact, and form in a sense one member, after the parts are assembled,— that is to say these elements are non-rotatable with reference to each other.

The wheel 18 is preferably of metal, and is formed in two parts by stamping, the edge portions of the separate elements overlapping at 34. This portion constitutes the periphery or rim of the wheel, the central portion of the wheel being wider as shown at 35, providing the necessary rigidity, affording a somewhat narrow periphery, and permitting the wheel to more readily follow the direction of travel of the vehicle.

What is claimed is:

1. In a device of the class described, a wheel, a yoke for mounting the wheel, a plate to be secured to the body of the vehicle, a race member, means for securing the race member to the plate, said means retaining the yoke in position for permitting an element thereof to cooperate with the race members, and anti-friction devices between said element of the yoke and race members, the aforesaid yoke including a slotted extension, and a stationary element engaging the slotted portion for limiting the swinging of the yoke.

2. In a device of the class described, a wheel, a yoke for mounting the wheel, said yoke comprising an upper element, side members between which the wheel is mounted, and a slotted extension projecting from the upper element, a plate to be secured to a stationary portion of a vehicle, means pivotally connecting the yoke and plate, and a pin entering the slotted portion and limiting the angular movement of the yoke about its pivot.

In testimony whereof I affix my signature.

EDMOND REMACLE.